United States Patent
Ambuel

(10) Patent No.: US 7,263,598 B2
(45) Date of Patent: Aug. 28, 2007

(54) DETERMINISTIC REAL TIME HIERARCHICAL DISTRIBUTED COMPUTING SYSTEM

(75) Inventor: Jack Robert Ambuel, 6 Ashley Cir., Madison, WI (US) 53719

(73) Assignee: Jack Robert Ambuel, Madison, WI (US)

( * ) Notice: Subject to any disclaimer, the term of this patent is extended or adjusted under 35 U.S.C. 154(b) by 848 days.

(21) Appl. No.: 10/732,605

(22) Filed: Dec. 9, 2003

(65) Prior Publication Data

US 2004/0123291 A1 Jun. 24, 2004

Related U.S. Application Data

(60) Provisional application No. 60/432,715, filed on Dec. 12, 2002.

(51) Int. Cl.
*G05B 19/18* (2006.01)
*G05B 15/02* (2006.01)
*G06F 15/00* (2006.01)
*G06F 15/76* (2006.01)
*G06F 15/16* (2006.01)

(52) U.S. Cl. .................. 712/34; 700/2; 700/3; 700/9; 345/503

(58) Field of Classification Search ............... 700/2–3, 700/9; 712/34; 345/503
See application file for complete search history.

(56) References Cited

U.S. PATENT DOCUMENTS

| | | | | |
|---|---|---|---|---|
| 5,113,523 A | * | 5/1992 | Colley et al. ................ | 712/12 |
| 5,845,148 A | * | 12/1998 | Ichikawa et al. ............. | 710/8 |
| 6,131,153 A | * | 10/2000 | Takamatsu ................... | 712/28 |
| 6,225,025 B1 | * | 5/2001 | Hoshino ..................... | 430/296 |
| 6,311,262 B1 | * | 10/2001 | Hachmann et al. .......... | 712/32 |
| 2004/0019627 A1 | * | 1/2004 | Hattori et al. ............. | 709/202 |
| 2004/0078547 A1 | * | 4/2004 | David et al. ................ | 712/1 |

* cited by examiner

*Primary Examiner*—Ronald D Hartman, Jr.

(57) ABSTRACT

The computer system is comprised of three main components: the core processing trait, the software rules/protocols, and the system architecture. The complete system consists of a number of distributed core processing units distributed in a hierarchical architecture. Core processing units at the top of the hierarchy and at all intermediate levels perform supervisory control, monitoring, and message passing functions. Core processors at terminating points in the hierarchical structure: control and/or monitor devices, machines, and instruments; or execute applications and perform computational functions. Because of the inherent flexibility of the computer system, it can be structured to accomplish any computational task including industrial control and monitoring, data acquisition, instrument control, embedded control, process control and monitoring, general purpose computing and virtually any other computing task.

1 Claim, 8 Drawing Sheets

*Block Diagram of Expanded Core Processing Unit*

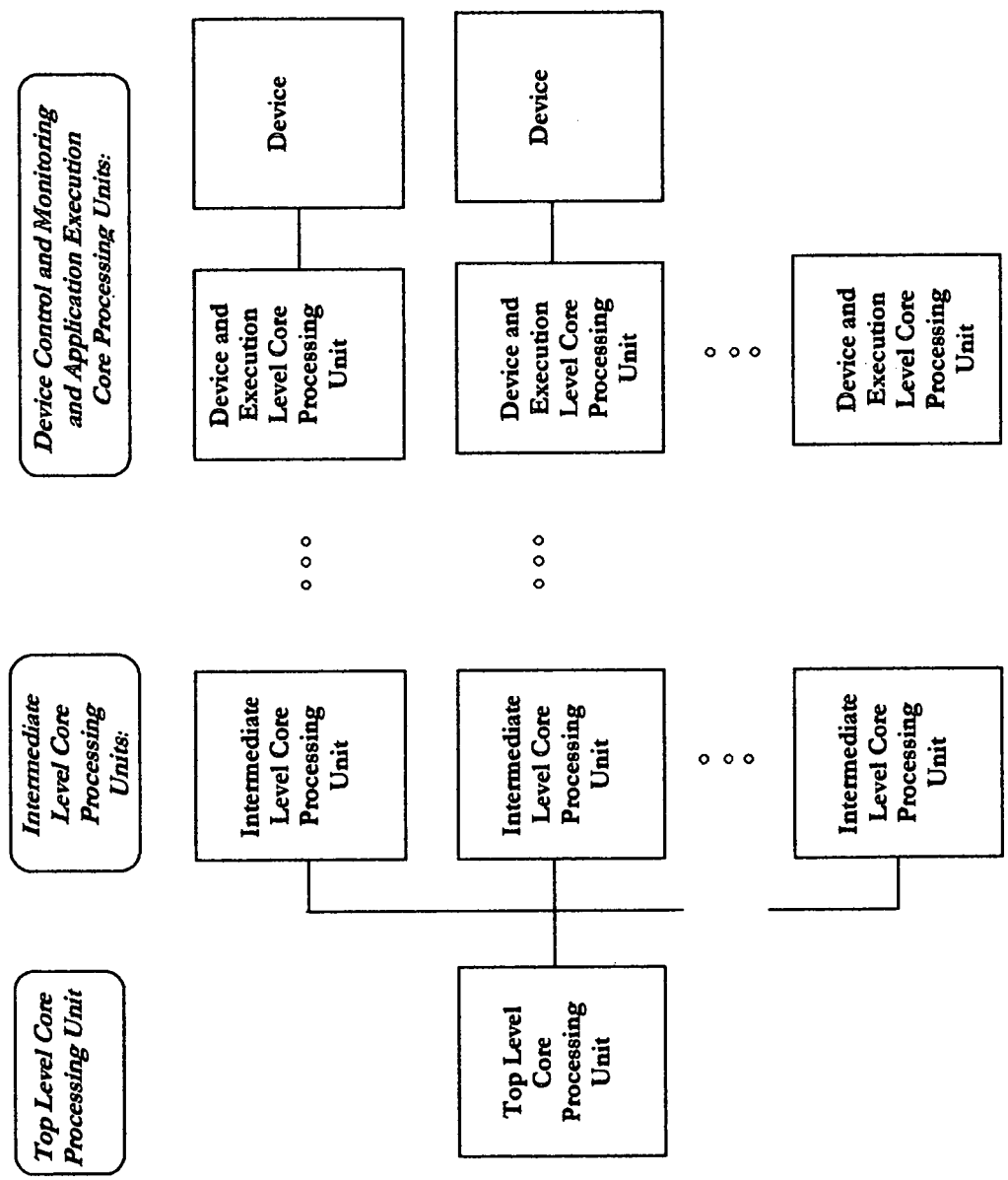
Figure 1: Block Diagram of an Example of a Complete Deterministic Real Time Hierarchical Distributed Computing System

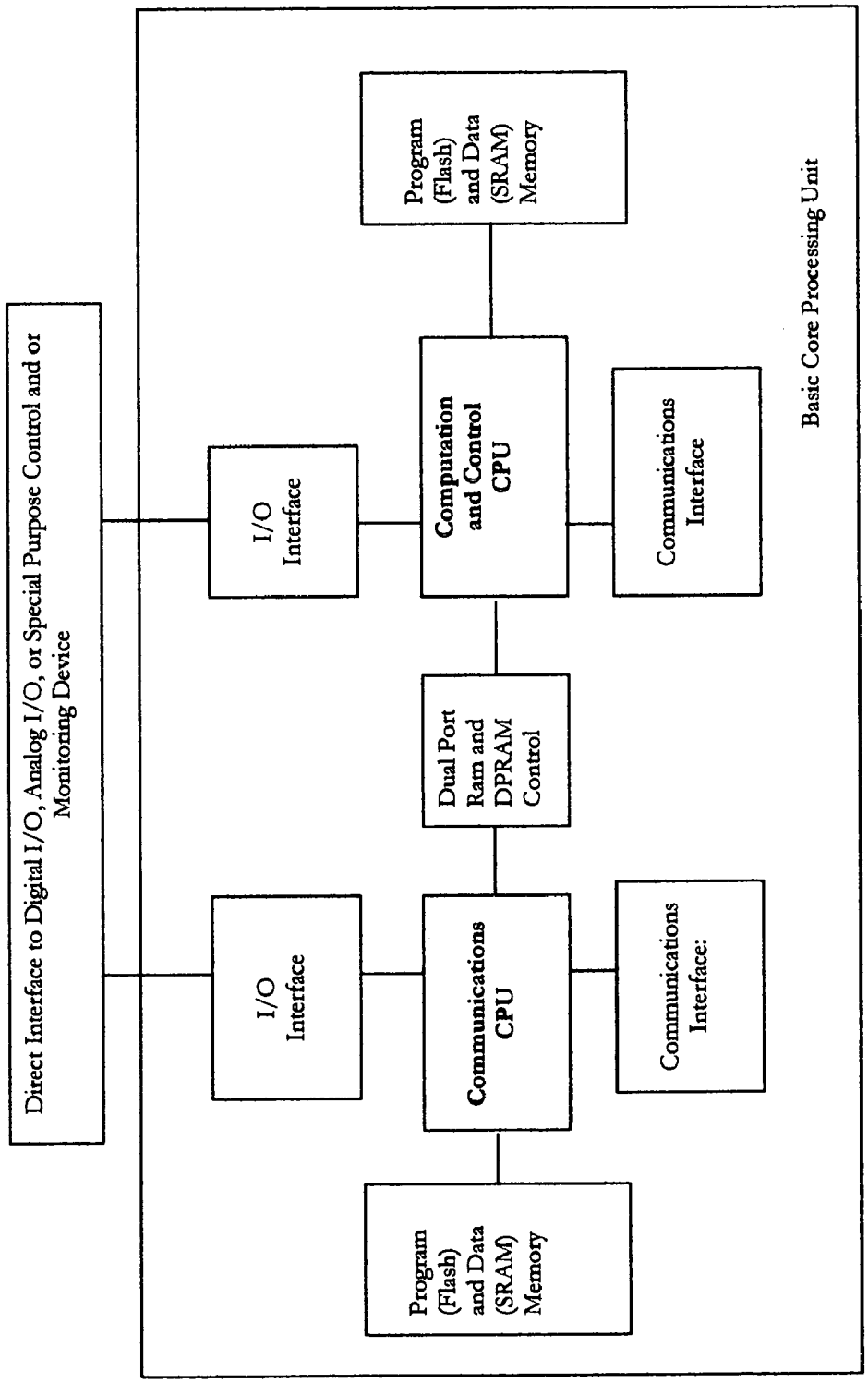
*Figure 2: Block Diagram of Basic Core Processing Unit*

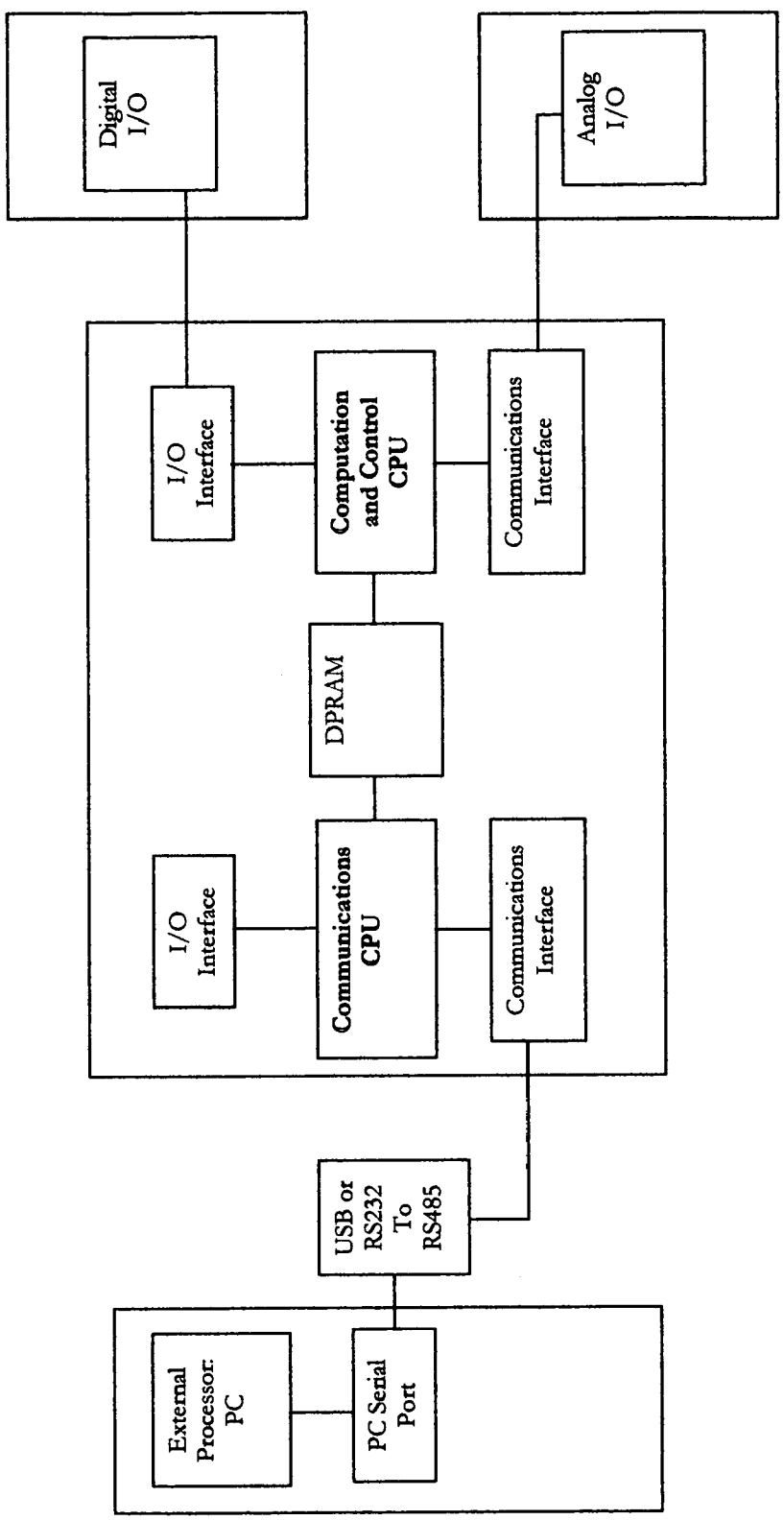
*Figure 3: Simple Distributed System Using One Basic Core Processing Unit for Direct Control and Monitoring and PC for Supervisory Control and Data Storage*

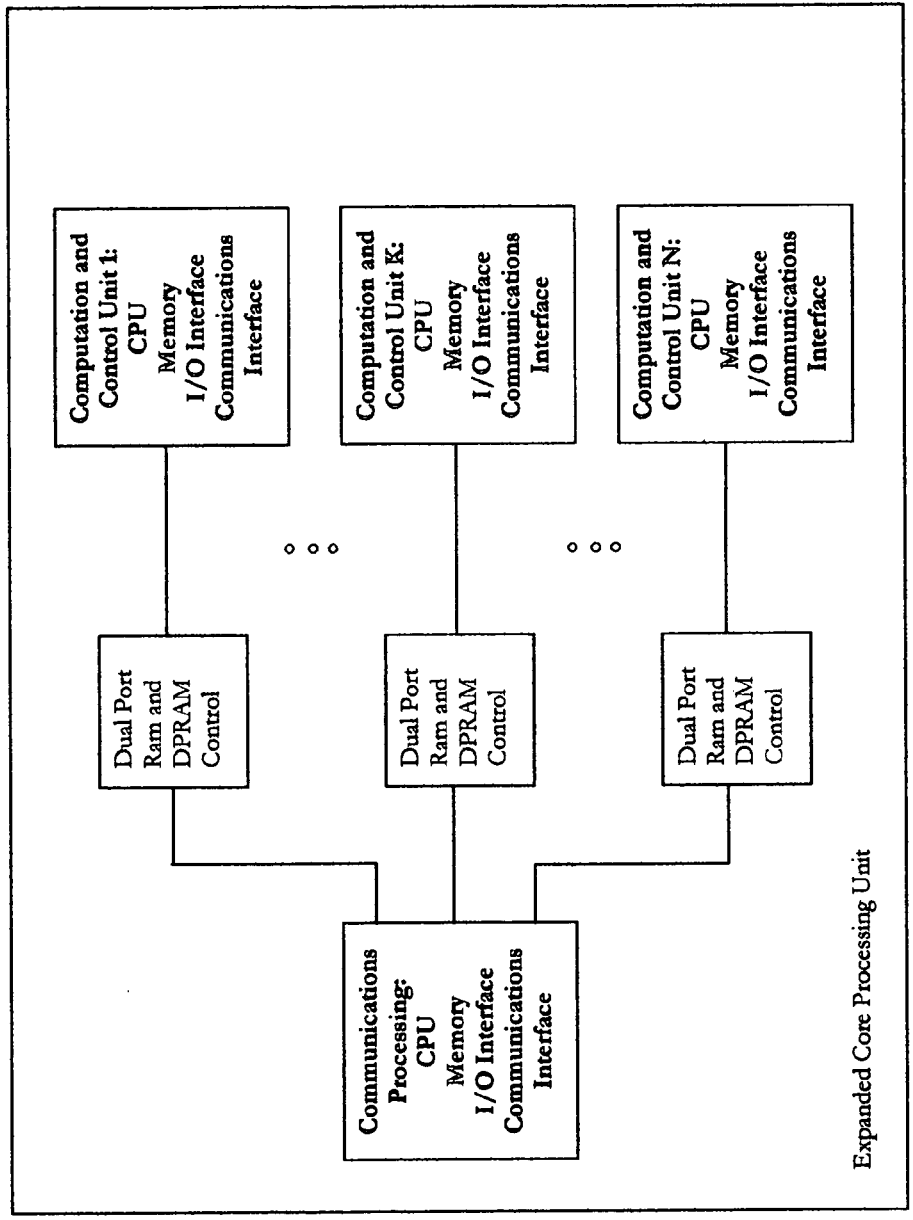
Figure 4: Block Diagram of Expanded Core Processing Unit

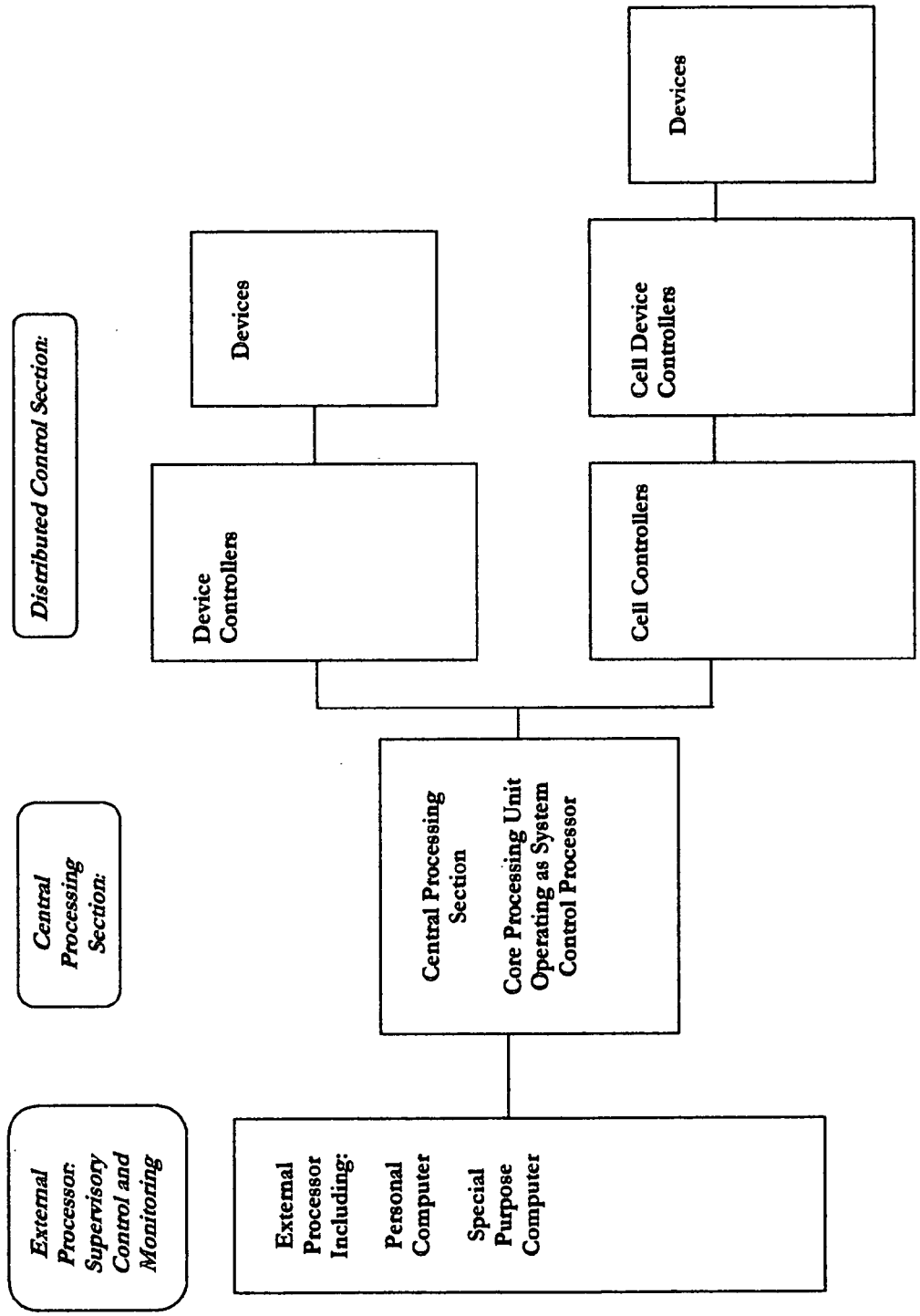
Figure 5: Deterministic Real Time Hierarchical Distributed Special Purpose Computing System

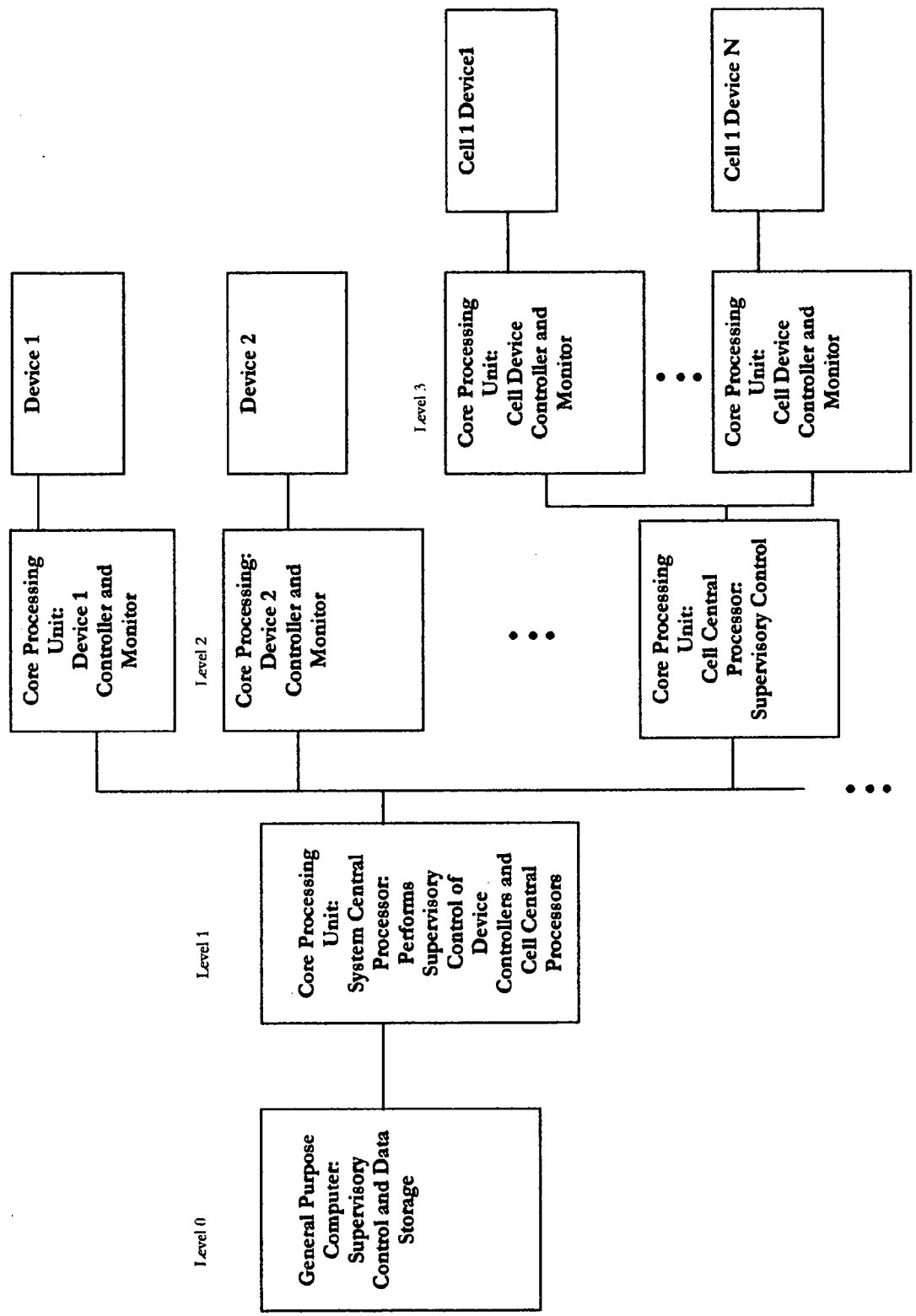
Figure 6: Deterministic Real Time Hierarchical Distributed Special Purpose Computing System Expanded View Showing Core Processing Units for Cell and Device Control and Controlled Devices

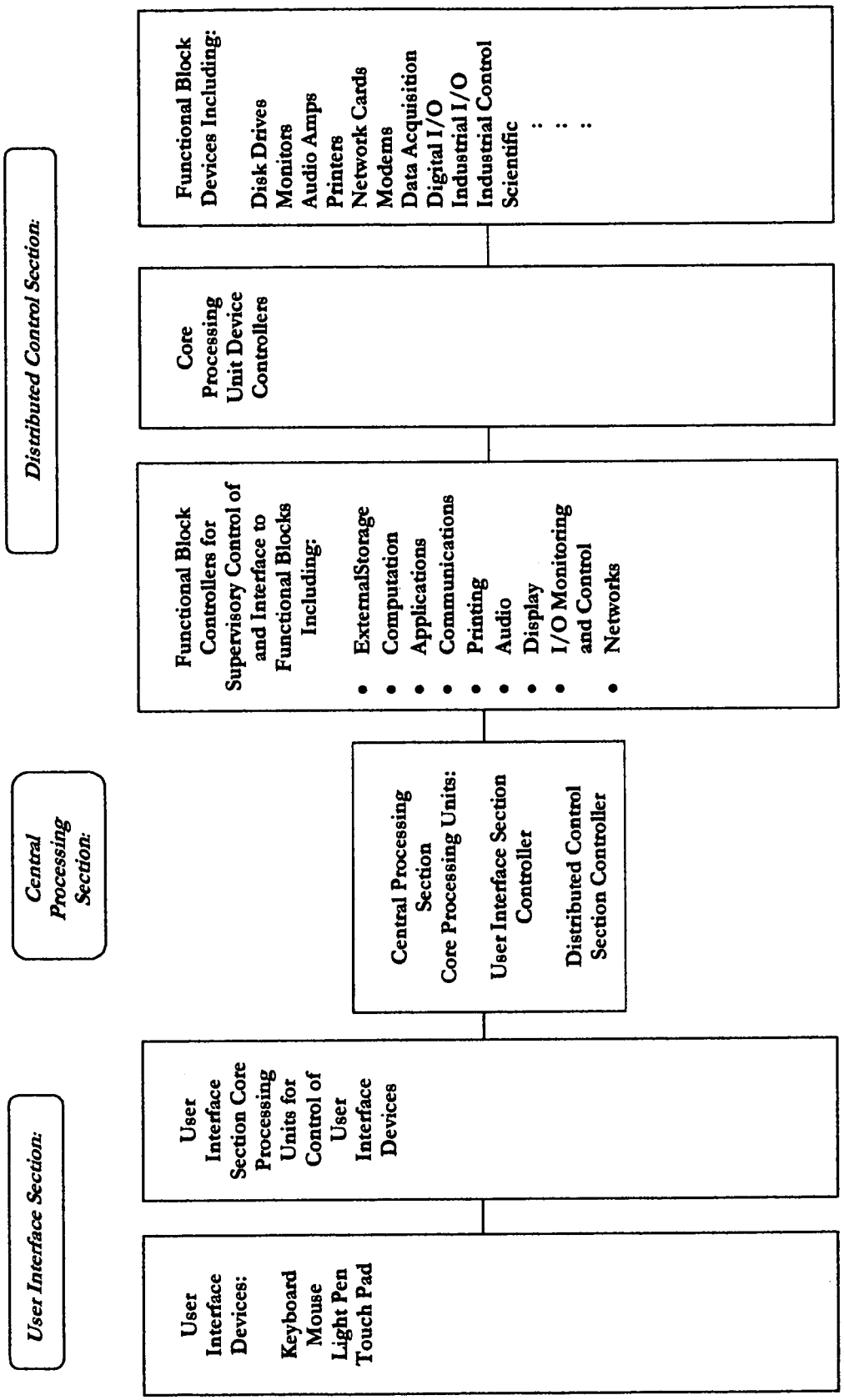
Figure 7: Deterministic Real Time Hierarchical Distributed General Purpose Computing System

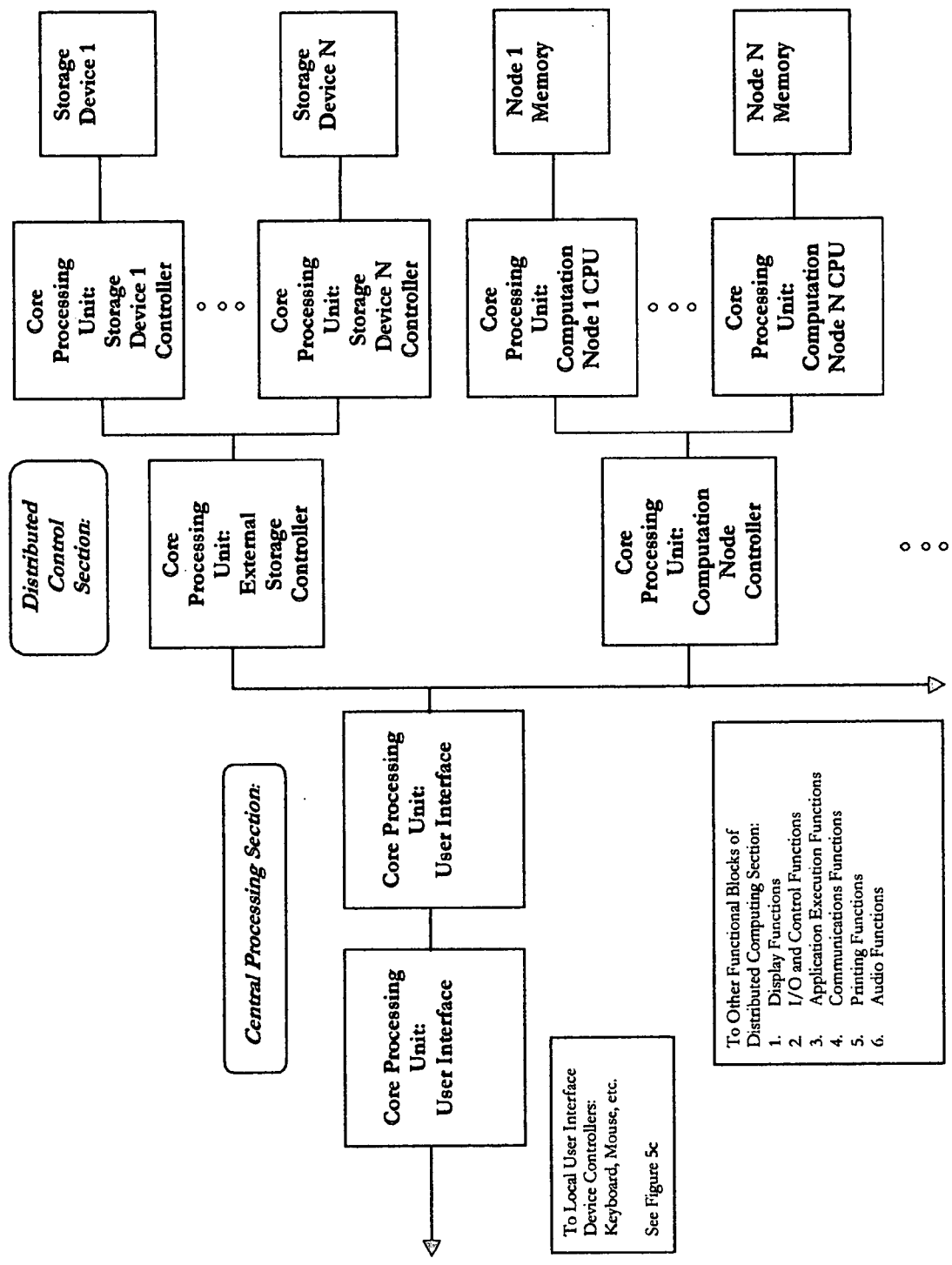
Figure 8: Deterministic Real Time Hierarchical Distributed Computing System: Expanded View of Central Processing Section and Distributed Computing Section

DETERMINISTIC REAL TIME HIERARCHICAL DISTRIBUTED COMPUTING SYSTEM

Continuation of Application No. 60/432,715, Dec. 12, 2002 (Provisional Patent Application).

FIELD OF THE INVENTION

The present invention relates to means for implementing a deterministic teal time hierarchical distributed computing system. More particularly, though not exclusively, the present invention relates to a method and apparatus using a specific combination of computer hardware and computer software design with a hierarchical structure that is inherently deterministic, operates in real time, with processing distributed among a number of different processors. In addition to real time deterministic operation, the other benefits of the invention are ease of design, use, and maintenance, transparency, scalability, design re-usability, and inherent design longevity.

BACKGROUND OF THE INVENTION

Since their emergence from University and Industry laboratories over 60 years ago, general-purpose electronic computers and computing systems have undergone explosive growth. In addition to general-purpose systems, application specific computing or special purpose computing (sometimes called embedded computing) has expanded with equal vigor. Together, the two types of computing have penetrated nearly all aspects of modern life.

The hardware and software foundations for both general purpose and embedded computing systems are the microprocessor or microcontroller, and the operating system. The vast majority of computers are based on the stored program sequential computing architecture developed by John Von Neumann. Computers based on this architecture are called Von Neumann machines.

This architecture has served us well for over 50 years as computing has permeated all aspects of our lives. But there are a number of emerging problems as computing becomes more diverse and complicated. The constant efforts to increase speed and processing power of computers is beginning to take its toll in complexity as well as extracting greater economic cost as technological lifetimes shorten. A number of techniques employed to expand the capabilities of general purpose computing have added ever-increasing burdens of complexity and maintainability. These techniques include: use of interrupts, multitasking real time pre-emptive prioritized operating systems, cache memory and branch predictive execution, peer to peer communications, event oriented operation, among others. Each of these techniques adds complexity to computer systems, increasing the costs of development and system maintenance. This added system complexity also makes verification of deterministic operation and calculation of worst-case response times increasingly difficult. Systems become so complex that timing analysis errors are easily made. Some of the techniques listed above—such as prioritization and preemption were developed to provide a method to guarantee worst case response times for critical tasks. But this added benefit has a consequence in greatly increased system complexity. Theoretically, these techniques may serve their purpose. As a practical matter, the systems become so complex there is a substantial risk that the system is not analyzed properly, design errors are made, and worst case response times are not met. While there has never been a great need for deterministic real time general purpose computers, the complexity of multi tasking real time operating systems has begun to jeopardize the determinism and real time operation of special purpose computers for which real time operation is essential.

Other methods used to improve software productivity have now become so complex and specialized that their original benefits are being eroded. One prime example of this is object-oriented programming. Hardware and software obsolescence have become so rapid that equipment that may be adequate for 15 or 20 years must be scrapped much earlier due to early component obsolescence (making repairs problematical) and software incompatibility. Design re-usability, much talked about, is almost never practiced, as systems are not designed for easy upgrade to new hardware and software technologies. Indeed, obsolescence has always been in the interest of equipment suppliers, but almost never in the interest of the users of that equipment.

The purpose of this invention is to address all of these emerging problems of current general and special purpose computers and enable the development of computing systems free from these concerns.

SUMMARY OF THE INVENTION

The present invention constitutes a deterministic real time hierarchical distributed computer system—hereafter referred to as the "computer system". The computer system is comprised of three main components: the core processing unit, the software rules and protocols, and the system architecture. The core processing unit is the basic computational unit in the computer system. The complete system consists of a number of distributed core processing units. These core processing units are distributed in a hierarchical architecture. Core processing units at the top of the hierarchy and at all intermediate levels perform supervisory control, monitoring, and message passing functions. Core processors at terminating points in the hierarchical structure: control and/or monitor devices, machines, and instruments; or execute applications and perform computational functions. The number of core processing units and their distribution depends on what the computer system is designed to accomplish. Because of the inherent flexibility of the computer system, it can be structured to accomplish any computational task including industrial control and monitoring, data acquisition, instrument control, embedded control, process control and monitoring, general purpose computing and virtually any other computing task.

The function of the hierarchical distributed architecture is to facilitate deterministic teal time operation of the computer system. This architecture combined with the basic structure inherent in each core processing unit and the software protocols and rules followed by the embedded code in each core processing unit guarantee determinism and real time response. How these three main blocks of the computer system work together is described in more detail in the Detailed Explanation Section.

BRIEF DESCRIPTION OF THE DRAWINGS

FIG. 1: Block Diagram of an Example of a Complete Deterministic Real Time Hierarchical Distributed Computing System FIG. 2: Block Diagram of Basic Core Processing Unit FIG. 3: Simple Distributed System Using One Basic Core Processing Unit for Direct Control and Monitoring and PC for Supervisory Control and Data Storage FIG. 4: Block Diagram of Expanded Core Processing Unit FIG. 5: Deterministic Real Time Hierarchical Distributed Special Purpose Computing System FIG. 6: Deterministic Real Time Hierarchical Distributed Special Purpose Computing System Expanded View Showing Core Processing Units for Cell and Device Control and controlled Devices FIG. 7: Deterministic Real Time Hierarchical Distributed General Purpose Computing System FIG. 8: Deterministic Real Time Hierarchical Distributed Computing System: Expanded View of Central Processing Section and Distributed Computing Section

DETAILED DESCRIPTION OF THE INVENTION

The following description of the present invention applies to its preferred embodiment. The present invention, however, is not limited to the described embodiment. This invention constitutes a computer system using specific computer hardware and computer software designs combined in a hierarchical structure that is inherently deterministic and operates in real time with processing distributed among a number of different processors. In addition to real time deterministic operation, the other benefits of the invention are: ease of design, use, and maintenance; transparency; scalability; design re-usability; and inherent design longevity.

There are three main components that are the foundation of this invention and which are the basis for its characteristics and benefits described in the paragraph above. One component relates to the hardware, one to the software, and the third to the system architecture. A general description of these components and how they fit together was given in the Summary above. In this section, the components and how they fit together will be described in detail. The three components are:

1. Core Processing Units. These are the smallest computational components of the system and serve as the hardware building blocks from which the system is constructed. The Core Processing Units constitute the distributed processing elements in the system. Their specific architecture and design is one key feature of the system that ensures determinism and real time operation.
2. Software Protocol and Rules. This protocol and set of rules is another key feature of the system that ensures determinism and real time operation. In addition, these protocols and rules facilitate the following: ease of design, use, and maintenance; transparency; design re-usability; and longevity.
3. System Architecture. The system architecture establishes the hierarchical distributed framework for the system. This framework is the third key feature of the system enabling real time deterministic operation as well as enabling scalability.

All three components are essential parts of the computer system. It is the combination of the three components that results in the complete computer system with all of its capabilities and benefits.

Computer System and System Architecture

A block diagram showing one example of a complete computer system is presented in FIG. 1. The diagram shows a hierarchical system of distributed core processing units. The top-level core processor provides supervisory control and monitoring for the entire system. Below the top-level core processor is one or more intermediate levels. Core processing units at the intermediate levels provide supervisory control and monitoring of different functional blocks and sub sections of those blocks. For any given path through the system architecture, the system terminates at Device Execution Level Core Processing Units. These units control and/or monitor external devices or execute some application. These units can be located at any level in the hierarchy depending on the number of intervening levels of intermediate core processing units, but always sit at the end of a particular branch in the hierarchy.

The computer system, in addition to being physically hierarchical, is logically hierarchical as well. The logical hierarchy is built into the software protocols that govern communications between processors. By this is meant that messages always flow from top to bottom and responses from bottom to top. The top-level core processor always sends the initial message and it receives the final response. This is described in more detail in the following sections.

The hierarchical architecture built around core processing units running embedded code enables a deterministic real time distributed computer system. The architecture is inherently distributed and the determinism and real time response arises from the hardware and software design rules employed as described below.

The hierarchical architecture also guarantees scalability, as it is inherently scalable. Scale up can be accomplished in two ways. One is by adding more nodes and more levels to the hierarchy. The second is by increasing the processing power of the individual processors on the core processing units.

The hierarchical architecture also enables design longevity and reusability. By replacing core processing units using obsolete components with core processing units using up to date components and backward compatibility, the system can be maintained over a long period of time. The building block approach enables re-use of individual processing units in other applications.

Software Protocol and Rules

The software rules and protocols that support deterministic real time execution as well as ease of design, use, maintenance, and other features of the system are:

Use of simple Round Robin Kernel with no preemption or prioritization

Use of polling instead of interrupts

Use of sequential function oriented programming instead of object oriented programming Use of global variables Use of dual port rams for inter-processor communications Use of ASCII text for inter-processor communications and commands, transfer of data between processors, and for archival storage.

Use of master slave architecture. No peer to peer communication.

Single message communication with all communications messages acknowledged before next message sent.

These protocols combined with a distributed hierarchical system architecture and core processor design enable the computer designer to easily construct a system that is inherently deterministic with measurable response times (ie. real time response that is less than or equal to some maximum response time). The protocols eliminate those features common to the vast majority of current computer systems that make deterministic real time response difficult if not impossible to guarantee. Those features include interrupts, prioritized preemptive multi-tasking operating systems, event driven object oriented programming, peer to peer multiple message communications, and non hierarchical (flat) architectures. Substituting these techniques with a simple round robin operating system, sequential function oriented programming, polling, dual port rams, master slave architecture, and single message communications with acknowledge, make the system deterministic and maximum response times easily calculated.

In addition to enabling determinism and real time response, all of these rules serve to simplify the development, use, and maintenance of software for the system. Object oriented programming, data hiding, and elimination of global variables has, contrary to popular opinion, made development and maintenance more complicated not less. Replacement of object oriented programming and local variables with sequential functional programming and global variables greatly simplifies development and maintenance tasks. Programs do not become unwieldy because this computer system, instead of having one large processor executing many tasks, consists of many small processors each executing only a few tasks.

Use of ASCII data format for commands and data transport between processors and for data storage makes the system more transparent. This transparency can be enhanced in the future by developing and using individual processors on the core processing units that execute ASCII command sets at the machine language level.

By using a fixed set of ASCII commands and protocols for communications between processors, system longevity is enhanced. New core processing units can replace old core processing units by designing the new core processing units to use the fixed ASCII command sets for inter processor communications.

Core Processing Units

As previously noted, the core processing units are the hardware building blocks of the system. These units combined with the software protocols and system architecture enable real time deterministic operation of the computer system as well as insure ease of development, maintenance, and use and all other features of the system. As discussed in the preceding section, determinism, real time response, and all of the other features and benefits of the system are inherent in a system based on the hierarchical architecture described above which adheres to the software protocols and rules described in the preceding section. However, in order for these protocols and rules to be practical, the core processing unit architecture must be specially designed. In particular, this architecture must enable the operating system software to employ a simple round robin kernel without preemption and prioritization and forego the use of interrupts.

The basic architecture of each core processing module that meets these requirements consists of a communications processing section (CPS) and a computation, control, and monitoring processing section (CCMPS) linked via dual port ram (DPRAM). The CPS has a single task—serving as a communications link between one upper level core processing unit and the on board computation, control, and monitoring processing section (CCMPS). Message passing between CPS and CCMPS is done via DPRAM. The tasks of the CCMPS depend on its location in the computer system hierarchy. If the CCMPS terminates a branch in the hierarchy, it will control and/or monitor external devices, or execute an application or perform a computation. If it is at an intermediate level it will serve as supervisory controller, monitor, and message passing unit for any number of lower level core processing units.

A block diagram of the most basic core processing unit is shown in FIG. 2. In this unit the CPS and CCMPS consist of single processors. Each processor has is own local data and program memory, communications interface, and I/O interface. An expanded capability core processing unit is shown in FIG. 4. In this version, the CPS again consists of one processor but there are multiple processors in the CCMPS. Any number of different configurations are possible, but all configurations must consist of a communications processing section and a control, computation, and monitoring processing section linked by one or more dual port rams.

The system architecture is set up such that the CPS on one core processing unit serves as liaison between a single upper level core processing unit and the on board CCMPS. It receives messages from the upper level unit and passes them onto the on board CCMPS through the dual port ram. It then waits for a response from the CCMPS and passes that response on to the upper level computer or processing unit. If the core processing unit is at an intermediate level, then the CCMPS will be performing supervisory control, monitoring, and message passing for lower level core processing units. It may pass information or commands it receives in the message on to one or more of those lower level core processing units. On the other hand, if the core processing unit is at a terminating level (device and execution level) it will be controlling some external device or executing some application. It will then act on the message it receives accordingly depending on whether it has received a command, a request for information, or both.

In summary, on each core processing unit, the CPS will receive a message from the CCMPS of a single upper level core processing unit. It will pass that message on to the on board CCMPS via the dual port ram. The on board CCMPS will then either pass one or more messages on to the CPS of one or more lower level core processing units, or will interpret the message and take appropriate action if it is controlling an external device or executing an application. The CCMPS will then send a response message at the appropriate time to the on board CPS through the dual port ram. The CPS will then respond to the upper level core processing unit. After receiving the response, the upper level core processing unit will then be free to send the next message.

Because the system is hierarchical, all initial messages are sent by upper level processing units to lower level processing units. Because sequential single message passing is used, the upper level core processing unit or computer will wait until the lower level has responded before sending the next message. The combination of this single message sequential communications technique with the use of dual port ram for on board message passing between CPS and CCMPS enables the CPS to operate by poling the communications port instead of using interrupts. The CPS can pick up the incoming message one byte at a time until the complete message is received. Once a complete valid message is received, it can stop polling the communications port, place that message in the dual port ram, and wait for a response. When the CCMPS places its response in the dual port ram, the CPS will retrieve the response, package it, and send it to the upper level core processing unit. The cycle will then be repeated. Polling of the communications port by the CPS is completely adequate. Interrupts are not required because the next message is not sent until a response is sent. Sequential hierarchical communications combined with a round robin operating system that employs poling also allows the worst case response time of a given system to be calculated with certainty.

For the CCMPS, a round robin operating system that employs polling is also adequate. If the CCMPS is on a core processing unit at the device and execution level and is executing an application, the message received will either alter this application in some way or request information about results or status. Because a dual port ram is used for message passing, the CCMPS does not have to respond immediately when a message is delivered. Instead the CCMPS can check the message status lines periodically. When the status lines indicate that a message has been delivered, the CCMPS can then retrieve the message and process it. Using a round robin operating system, the CCMPS can alternate between application execution and message processing. When a message is processed, the CCMPS will generate a response and load the response into the dual port ram. The time for the message to be processed and a return response sent can again be calculated with certainty.

If the CCMPS is controlling a device instead of executing an application, the response time of the device must be known in order to determine the complete response time. If the CCMPS is controlling an external device, a device with published response times for either parallel or serial data transfer must be selected in order to insure determinism and the ability to calculate worst case response times. If the CCMPS is controlling a device with special purpose interface electronics designed as part of the computer system, then the device must be designed with deterministic response times.

If the CCMPS is on a core processing unit at some intermediate level of the hierarchy, it will serve as supervisory controller, monitor, and message passing processor for lower level core processing units. When the CCMPS receives a message from the on-board CPS, it will process the message and extract and construct all embedded messages to the lower level processing units. It will then send out the messages one at a time. It will wait for a response to each message before sending the next message. This procedure is followed until all messages are sent and all responses received. Then it will package the responses together and send the package to the CPS via dual port ram. Message transfer organized in this manner will enable the CCMPS to use a round robin operating system with polling. Worst case response times for a given system can be easily calculated.

In summary, there are a number of different types of core processing units that can be used, but all core processing units have the same basic architecture in common. That basic architecture consists of two processing sections that communicate with each other via dual port ram (DPRAM). The two processing sections are:

1. A communications processing section (CPS)
2. A computation, control, and monitoring processing section (CCMPS).

Each processing section has its own local storage (program and data) as well as I/O, and communications interface circuits. The core processing units are arranged in a hierarchical, distributed system. The software on each core processing section follow set protocols and rules including: use of a simple non preemptive non prioritized round robin operating system; polling of serial communications ports; no use of interrupts; master slave single message communications between processing units, and sequential function oriented programming. These rules combined with the core processing dual port ram centered architecture enable a distributed system to be designed that is deterministic and for which worst case response times can be easily and unambiguously calculated. Additional software rules and protocols are established which when combined with the rules above serve to simplify design, use, and maintenance of the computer system, make the system more transparent, and enhance reusability and longevity. These rules include: use global variables; and use of ASCII data for storage and inter-processor communications. These effects on computer system operation of the architecture, software, and hardware design are summarized in Table 1.

Distributed Systems

The purpose of this invention is to serve as the foundation of a wide variety of deterministic real time distributed control instrumentation, monitoring, and general purpose computing systems which are easy to design, use, and maintain, and which will last for a long time. Because the main elements of this invention—the core processing units—are inherently modular and are designed to operate in a distributed architecture, they can serve as the building blocks of a wide variety of different systems—from simple to complex—designed for many different applications. An example of the simplest type of system possible is shown in FIG. 3. This shows an example of a special purpose computer for use in controlling or monitoring a simple process, device, machine, or instrument. Block diagrams of a more complicated special purpose computing system are shown in FIG. 5 and FIG. 6. The computer system can also be used as the foundation for a general purpose computer. Block diagrams of such a system are shown in FIG. 7 and FIG. 8.

In both cases, special purpose computing systems and general purpose computing systems, the system will interface to external devices. For special purpose computing systems examples of these external devices will include: industrial machines, laboratory instruments, consumer electronic devices, measuring devices, surveillance equipment, household appliances, transportation equipment, construction equipment, printing equipment, scientific instruments, and many others. In addition, an external computer may be connected to the top level core processor for supervisory control and/or monitoring of the system. For general purpose computing systems, examples of the external devices include printers, monitors, speakers, mass storage, communications devices, network devices, etc. For many of these applications, most if not all of the main features and characteristics of this invention as listed in Table 1 will be of direct benefit. In the past these benefits may have been outweighed by the added cost of hardware. With increasing integration of semiconductor components and falling prices, combined with the escalating costs of software, this is no longer the case. This along with the need to overcome the environmental costs of rapid obsolescence of modern technology will give impetus to the adoption of new approaches such as the one embodied in this invention.

TABLE 1

Contribution of Architecture, Software, and Hardware of Computer System to Main Features and Characteristics of the System

| Component | Rule or Feature | Determinism | Real Time Operation | Ease of Design | Ease of Maintenance | Ease of Use | Transparency | Scalability | Reusability | Longevity |
|---|---|---|---|---|---|---|---|---|---|---|
| Architecture | Distributed | | | | | ✓ | | ✓ | ✓ | ✓ |
| | Hierarchical | ✓ | ✓ | | | ✓ | | ✓ | ✓ | ✓ |
| Software | Round Robin Kernel | ✓ | ✓ | ✓ | ✓ | | ✓ | | | |
| | Polling (no Interrupts) | ✓ | ✓ | ✓ | ✓ | | ✓ | | | |
| | Sequential Functional Programming | ✓ | ✓ | ✓ | ✓ | | ✓ | | | |
| | Global Variables | | | ✓ | ✓ | | ✓ | | | |
| | ASCII Text | | | ✓ | ✓ | ✓ | ✓ | | ✓ | ✓ |
| | Master Slave Architecture | ✓ | ✓ | ✓ | ✓ | ✓ | ✓ | ✓ | ✓ | ✓ |
| | Single Message Com | ✓ | ✓ | ✓ | ✓ | | ✓ | | | |
| Hardware | Dual Port Ram | ✓ | ✓ | ✓ | ✓ | | ✓ | | | |
| | Dual Processing | ✓ | ✓ | ✓ | ✓ | | | | | |

The invention claimed is:

1. What is claimed is a deterministic real time computing system for use in general or special purpose applications based on a top down hierarchical physical and logical architecture composed of core processing units, with each core processing unit consisting of one communications processing section and one computation control and monitoring processing section that communicate through Dual Port Ram, with the communications processing section consisting of a single processor, with the communications control and monitoring processing section consisting of one or more processors, with all processors running non preemptive and non prioritized Round Robin real time operating systems, with all processors using only polling and no interrupts to monitor communication ports or other devices, with all processors using sequential function oriented programming and not object oriented programming, with all processors using single message communication—waiting for a response before sending the next message, with all processors using global variables with limited use of local variables, with all processors using ASCII text for all data and communications, with the two processing sections organized hierarchically with the communications processing section being the master and the computation control and monitoring processing section being the slave, with core processing units also organized in a master slave inverted tree structured hierarchy, with the top level core processing unit communicating with external general purpose computers or serving as the man machine interface, with all intermediate level core processing units performing supervisory control, monitoring and message passage functions, with the computation and control processing sections on an higher intermediate level communicating with one or more communications processors on the next lower level core processing units, with the communications between core processing units being master slave and not peer to peer, and with all core processing units at branch termination points of the tree controlling or monitoring some external device or executing some application.

* * * * *